United States Patent
Slobodin (10) Patent No.: US 7,924,362 B2
(45) Date of Patent: Apr. 12, 2011

(54) BEZELLESS DISPLAY SYSTEM HAVING A DISPLAY ASSEMBLY WITH AN OVERLAY INCLUDING A TRANSPARENT SECTION OPTICALLY BONDED TO A DISPLAY REGION WITH AN OPTICAL LAYER THAT INCLUDES A PRE-CURED ADHESIVE PREFORM

(75) Inventor: David Elliott Slobodin, Hillsboro, OR (US)

(73) Assignee: VIA optronics, LLC, Hillsboro, OR (US)

( * ) Notice: Subject to any disclaimer, the term of this patent is extended or adjusted under 35 U.S.C. 154(b) by 234 days.

(21) Appl. No.: 12/106,195

(22) Filed: Apr. 18, 2008

(65) Prior Publication Data

US 2008/0261057 A1    Oct. 23, 2008

Related U.S. Application Data (60) Provisional application No. 60/925,494, filed on Apr. 20, 2007.

(51) Int. Cl.
  *G02F 1/1333*    (2006.01)
(52) U.S. Cl. ............................................ 349/58; 349/12
(58) Field of Classification Search ............... 349/58–60, 349/12
  See application file for complete search history.

(56) References Cited

U.S. PATENT DOCUMENTS

| | | | |
|---|---|---|---|
| 5,793,461 A | 8/1998 | Inou | |
| 5,969,847 A | 10/1999 | Coleman et al. | |
| 6,020,945 A | 2/2000 | Sawai et al. | |
| 6,168,851 B1 | 1/2001 | Kubota | |
| 6,181,394 B1 | 1/2001 | Sanelle et al. | |
| 6,246,459 B1 | 6/2001 | Simhambhatla et al. | |
| 6,356,376 B1 | 3/2002 | Tonar | |
| 6,428,650 B1 | 8/2002 | Chung | |
| 6,494,987 B1 | 12/2002 | Yamaguchi et al. | |
| 6,646,076 B1 | 11/2003 | Kendall et al. | |
| 6,762,752 B2 | 7/2004 | Perski et al. | |
| 6,933,991 B2 | 8/2005 | Sanelle et al. | |
| 2005/0007349 A1 | 1/2005 | Vakil et al. | |
| 2005/0083307 A1 | 4/2005 | Aufderheide et al. | |
| 2005/0094039 A1* | 5/2005 | Kim et al. | ........................ 349/12 |
| 2005/0212990 A1 | 9/2005 | Robinder et al. | |
| 2006/0202042 A1 | 9/2006 | Chu | |
| 2007/0020319 A1 | 1/2007 | Bougherara et al. | |
| 2007/0057970 A1 | 3/2007 | Vasilache | |
| 2007/0062739 A1 | 3/2007 | Philipp et al. | |

(Continued)

OTHER PUBLICATIONS

ISA United States, International Search Report of PCT/US2008/03587, Jun. 25, 2008, WIPO.

(Continued)

*Primary Examiner* — John Heyman
(74) *Attorney, Agent, or Firm* — Alleman Hall McCoy Russell & Tuttle LLP (57) ABSTRACT

A display system is provided including a display assembly with a display region of a first size, an overlay having a first substantially transparent section corresponding to the size of the display region of the display assembly and a second customized section extending beyond the first substantially transparent section, and an adhesive optically bonding the display region of the display assembly to the overlay. In some embodiments, the display assembly is one of a liquid crystal display, an organic light emitting diode display, and an electronic paper display. In some embodiments, the second customized section of the overlay may include an accessory, such as a sensor accessory, an actuator, or a coating.

22 Claims, 6 Drawing Sheets

U.S. PATENT DOCUMENTS

| | | |
|---|---|---|
| 2007/0070589 A1 | 3/2007 | Chen et al. |
| 2007/0074316 A1 | 3/2007 | Alden et al. |
| 2007/0181456 A1 * | 8/2007 | Kusuda et al. ............... 206/443 |
| 2008/0230177 A1 | 9/2008 | Crouser et al. |
| 2008/0266273 A1 | 10/2008 | Slobodin et al. |

OTHER PUBLICATIONS

ISA United States, International Search Report of PCT/US2008/05005, Jul. 15, 2008, WIPO.

U.S. Appl. No. 60/918,974, filed Mar. 19, 2007, Crouser et al.

U.S. Appl. No. 60/925,494, filed Apr. 20, 2007, Slobodin.

ISA United States, International Search Report of PCT/US08/05365, Aug. 20, 2008, WIPO, 3 pages.

"CapSense," Cypress Perform, Cypress Semiconductor Corporation, www.cypress.com, Accessed Mar. 30, 2007, 7 pages.

Stetson, John W., "Analog Resistive Touch Panels and Sunlight Readability," Sunlight Readability, Information Display, Google Search: http://www.gunzeusa.com/files/pdf/ID_Gunze_Dec-20170-1.pdf, Dec. 2006, 5 pages.

* cited by examiner

BEZELLESS DISPLAY SYSTEM HAVING A DISPLAY ASSEMBLY WITH AN OVERLAY INCLUDING A TRANSPARENT SECTION OPTICALLY BONDED TO A DISPLAY REGION WITH AN OPTICAL LAYER THAT INCLUDES A PRE-CURED ADHESIVE PREFORM

CROSS-REFERENCE TO RELATED APPLICATION

The present application claims priority to U.S. Provisional Patent Application Ser. No. 60/925,494 of David Elliott Slobodin, entitled BEZZELLESS DISPLAY filed Apr. 20, 2007, the disclosure of which is hereby incorporated by reference.

FIELD

The present application relates to systems, apparatus and methods for interfacing optical layers, and more particularly systems, apparatus and methods for enhancing a display system.

BACKGROUND

Display systems, such as liquid crystal display (LCD) systems, LED systems, organic light emitting display (OLED) systems, etc. may be used in a variety of environments. Depending on the use environment and application of the display system, brightness and contrast features of the display system may be of significant value. For example, use of a display system in an outdoor environment or in an environment with high ambient light may require increased levels of contrast and/or brightness to maintain a desired level of viewability.

As an example, typical display systems include an LCD assembly. An LCD assembly may comprise a liquid crystal display cell having a thin film of liquid crystals sandwiched between a pair of transparent electrodes. The LCD cell typically includes a pair of glass plates, the glass plates being sealed together around their respective edges. The glass plates may be assembled with spacers between them to maintain a constant separation distance. Two crossed axis polarizers may be adhered to the respective outside surfaces of the glass plates, one polarizer being adhered to the front of the LCD cell and the other polarizer being adhered to the rear of the LCD cell. When a voltage is applied selectively across the electrodes, the liquid crystal molecules between them may be rearranged or switched in polarization so that light is either transmitted or absorbed in the output polarizer to form characters or graphics.

As an example, LCD assemblies are typically retained against and within a plastic or metal mechanical bezel. The mechanical bezel may decrease the viewable area of the display system, and often may extend outward away from the flat plane of the LCD assembly. The mechanical bezel may also have provisions (holes, mounting bosses, etc) for sensors, actuators, or other devices that can serve as on/off buttons, contrast controls, brightness controls, etc. The manner in which the LCD assembly and the mechanical bezel are mounted together affects the ability of the display to withstand mechanical wear, shock and environmental exposure (e.g., water, humidity, temperature, mechanical movement, or wear, etc.).

In order to improve the ability of the display to withstand mechanical wear, shock and environmental exposure it is known to add a protective layer, also referred to herein as a window overlay. This window overlay may be secured to the outer face of an LCD (or OLED) assembly as an interface between the display system and the viewer. For example, the overlay may be secured to the assembly through use of a mechanical bezel. This mechanical bezel may protrude from the surface of the display resulting in trapping of dirt, sand, salt water, etc. Further, the mechanical bezel may be affected by other environmental conditions, including shock, temperature, water, etc. In addition, the mechanical bezel may limit the aesthetic appeal of the device, and depending on the type of overlay and the use environment, the window overlay may impact the visibility of the displayed image.

The inventors herein have recognized that an improved overlay may be used to improve the environmental robustness and viewing characteristics of a display system. Additionally, the applicability and aesthetic appeal of the display system may be increased. Thus, as described in the disclosure below and as illustrated in the example figures, the inventors have provided methods, processes, systems and apparatus for providing an improved display system with an overlay, including methods, processes, systems and apparatus for bonding an overlay to a display assembly.

SUMMARY

Accordingly, embodiments of an improved display system are described herein. In one embodiment, a display system is provided including a display assembly with a display region of a first size, an overlay having a first substantially transparent section corresponding to the size of the display region of the display assembly and a second customized section extending beyond the first substantially transparent section, and an adhesive optically bonding the display region of the display assembly to the overlay. In some embodiments, the display assembly is one of a liquid crystal display, an organic light emitting diode display, and an electronic paper display. In some embodiments, the second customized section of the overlay may include an accessory, such as a sensor accessory, an actuator, or a coating.

DETAILED DESCRIPTION

Figure 1:
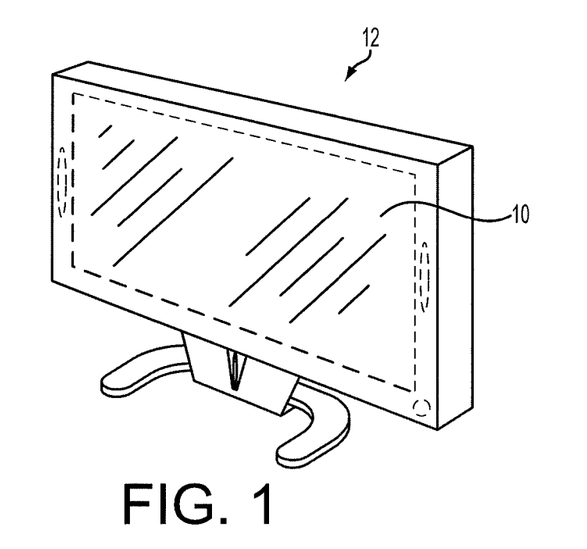
FIG. 1 an exemplary application of a display system included in a flat panel display apparatus according to an embodiment of the present disclosure.

The present disclosure is directed to a display system in which a display assembly is optically bonded to an overlay. As shown in FIG. 1 the display system 10 may be integrated into a monitor or flat panel display apparatus 12. It should be appreciated that display system may be integrated into a cellular phone display, a monitor, a television display, a display for a personal data assistant or other portable computing device, outdoors display, industrial display, medical display, navigational display, or other electronic presentation, data, or graphic display. As such, although described for example purposes herein as the display system including an LCD assembly, it should be appreciated that the display system may include any suitable display assembly upon which an overlay may be applied, including, LCDs, organic light-emitting diode (OLEDS), electronic paper (e-paper) displays, surface-conduction electron-emitter displays (SED), light emitting diode (LED) displays, electroluminescent displays (ELDs), etc.

The display system 10 may include an overlay which may improve the robustness of a display assembly and may provide mechanical and/or environmental protection in such display systems. In an LCD system or OLED system, as an example, the overlay may operate to protect the soft, polymeric top polarizer on the LCD or may protect the films and materials of the OLED. Further, the overlay may provide protection for systems which are stressed by their environments, including display systems in public kiosks or ATMs, or in display systems where a digitizer is used with a pen or stylus on the display system. In some embodiments, the overlay may also be actively functional, providing a touch interface or EMI shielding.

In contrast to systems which employ a number of protective top layers which are secured to the display through a mechanical bezel, the disclosed system provides a continuous top sheet which eliminates the need for a bezel. In the systems using a mechanical bezel, the mechanical bezel provides structural support to the display system. However, a mechanical bezel may increase the size and weight of the display system. In addition, the mechanical bezel decreases the viewable area of the display system, and often extends outward away from the flat plane of the LCD assembly.

The elimination of the bezel reduces the environmental effects which were a result of particle containment being trapped or getting lodged along the bezel and the display. Thus, a bezelless design may improve shock resistance, humidity resistance, salt water resistance, germ resistance, ease cleaning, and may improve the contrast of the displayed image under various lighting conditions. Limited or no shadowing occurs in systems without bezels. Furthermore, a bezelless design can simplify manufacturing, reduce manufacturing costs, and/or result in an overall reduction in the size of the display system.

As such, a continuous overlay which is secured directly to the display improves the durability of the system and also enhances the aesthetic appearance of the display. Moreover, sensors, actuators and coatings may be directly applied to the overlay or integrated within the overlay further improving the durability of the system and reducing manufacturing costs of the system.

As used herein, the term "bezelless" is used to describe an arrangement where a display is optically bonded to an overlay without necessity of a mechanical bezel where such mechanical bezel provides the primary purpose of retaining a multi-layered display assembly in position including an overlay. It should be understood that the disclosed principles herein can apply equally well to a display system that includes a bezel or frame, such as an external ornamental frame. Thus, although described in regards to a bezelless display system, the display system may use or incorporate one or more bezels or frames.

Figure 2:
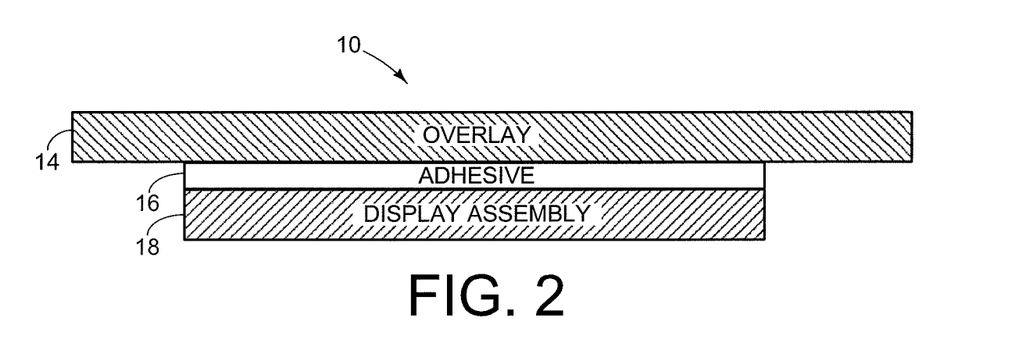
FIG. 2 shows a side view of a display system according to an embodiment of the present disclosure.

FIG. 2 schematically shows a display system 10 according an embodiment of the present disclosure. In the illustrated embodiment, the display system includes three layers: an overlay 14, an optical layer, such as adhesive 16, and a display assembly 18. In this example, the display assembly is an LCD assembly. However, as previously mentioned, the display assembly may be another suitable display assembly, including an OLED display, an electronic paper display, an LED display, etc.

Display assembly 18 may include an external facing surface upon which the optical layer, such as adhesive 16, may be coupled. For example, in an LCD, an external facing substrate may be a glass substrate, which is disposed on the exterior surface or face of the LCD. In other embodiments, the external facing surface may be the polarizer of the LCD.

Overlay 14 may be applied to the display assembly 18 to provide the layered display system 10. The inside surface of overlay 14 may be positioned to face the exterior surface of the display assembly, such as an LCD. The overlay may be any suitable material and may have at least a portion of the overlay where the index of refraction is similar to the index of refraction of the first substrate, although this matching is not required in all embodiments.

Disposed between overlay 14 and display assembly 18 may be an optical layer, such as adhesive 16. This optical layer may be a solid, gel or liquid. Typically, the optical layer may include an index-matched material such that the indices of refraction are substantially similar to one of the overlay and the external surface of the display region of the display assembly 18, or both. As one example, and not as a limitation, the external surface of the display assembly or the overlay may be glass and have an index of refraction of 1.472 such the bonding layer may similarly have an index of refraction of 1.406.

In some embodiments, the optically layer may be an optical adhesive. Although primarily described as an optical adhesive, in some embodiments, it should be appreciated that the bonding material may have little or no adhesion qualities and may be primarily an optically matched layer.

As described in more detail below, the bonding material may be a combination adhesive which is considered in application as a pre-cured optical adhesive. First, the bonding material may be applied as a liquid adhesive, also referred to herein as an optical bonding liquid, to one or both of the overlay or external surface of the display assembly. The bonding liquid may be fully or substantially cured to form an adhesive preform, and following curing, the second substrate may be laminated onto the display. The bonded enhanced layered display system may be post-processed to increase the adhesion strength of the bond and drive any entrapped air from the optical bond.

As an example and not as a limitation, the adhesive may be a silicone-based adhesive. For example, the adhesive may be a two-part cured silicone adhesive. Alternatively, the adhesive may be other suitable materials, including, but not limited to, urethane derivative materials and/or acrylic derivative materials. In some embodiments, the adhesive may be a mixture of urethane derivatives and silicone derivatives (and/or acrylic derivatives). The mixture of the harder urethane-derivative with the softer silicone-derivative may provide additional bonding characteristics. As another example, in some embodiments, bonding to glass may be with a urethane-derivative, and/or bonding to the display may be with a silicone-derivative. Further, in some embodiments, it may be possible to use an epoxy derivative.

As further examples, and not as limitations, the following specific materials are provided as illustrative example materials and may be used alone or in combination. Options for adhesives, include gels, elastomers and resins, including but not limited to, a mixture of dimethyl-silioxane and vinyl terminated dimethyl polymer with a hydrosilane crosslinking agent, a mixture of dimethyvinylsiloxy-terminated phenylmethyl cyclosiloxanes, methylvinyl siloxane, dimethoxy (glycidoxypropyl)-terminated, and/or polyether based aliphatic polyurethane.

In other embodiments, a multi-layer approach may include use of acrylic optically clear materials. Further a thinner may be applied to decrease the viscosity to the adhesive and assist in lamination. A material with a drying rate similar to acetone may be used such as hexamethyldisiloxane to achieve these effects. It should be appreciated that the adhesive may be selected based on a plurality of factors, including but not limited to: optical qualities, such as the index of refraction of the material, and mechanical qualities, including bonding characteristics and curing speed.

Figure 3:
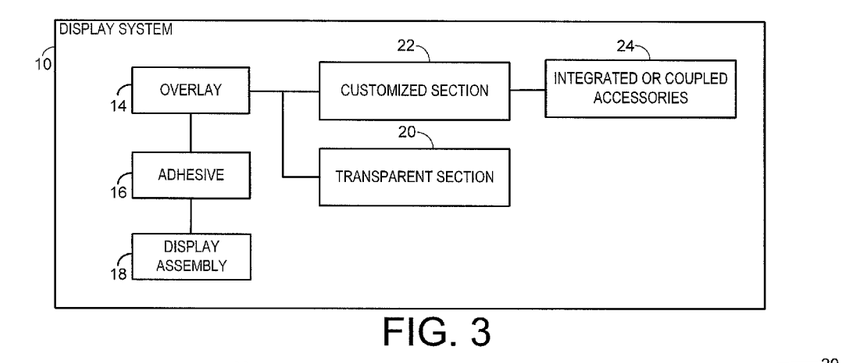
FIG. 3 shows an example block diagram of a display system.

FIG. 3 shows a block diagram of an exemplary display system 10. Again, the three layers are shown, an overlay 14, an adhesive 16, and a display assembly 18. In particular, FIG. 3 shows the how the overlay may be divided into a plurality of sections. In this example, the overlay is divided into a first and second section, 20 and 22 respectively. In other examples, the overlay 14 may be divided into more than two sections. Furthermore, one or more of the sections may be customized. In this example the second section is customized. The customization options 24 are shown in greater detail in FIG. 6, discussed in more detail herein.

Figure 4:
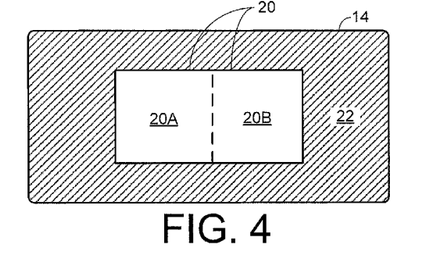
FIG. 4 shows a top view of an exemplary embodiment of an overlay for a display system.

FIG. 4 shows a top view of an exemplary overlay 14. The overlay is divided into a first section and a second section, 20 and 22, respectively. The first section 20 may be substantially transparent or partially transparent, allowing a user to view a display and/or electronic mechanism which may be bonded to the overlay 14. An optical layer may be disposed between this transparent section and a viewable portion, also referred to as a display region, of the display assembly. The optical layer may be an optical adhesive such that the layer includes an index-matched material such that the indices of refraction are substantially similar to one of the overlay and the external surface of the display assembly 18, or both.

Second section 22 may be customizable and may extend beyond the first section. For example, second section 22 may frame a viewable portion of a display which is vertically aligned with the first section 20. In other embodiments, second section 22 may extend beyond a single side of first section 20. Alternatively, second section 22 may extend beyond two sides of section 20, three sides of section 20, etc. The second section may be directly adhered or bonded to a second portion of the display assembly, a non-viewable portion of the display assembly. Further, the second section may be bonded to a product casing or shell and such adhesive may be the same or different than the optical layer used to couple the first transparent section to the display region of the display assembly. Likewise, and described in more detail below, various sensors, actuators, or other components may be bonded to the second customized section and such bonding material may be the same or different than the optical layer used to couple the first transparent section to the display region of the display assembly.

Figure 5:
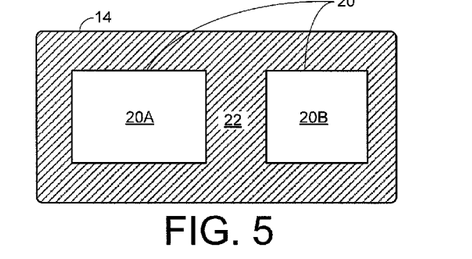
FIG. 5 shows a top view of another exemplary embodiment of an overlay for a display system.

In some examples, the first substantially transparent section may be divided into a first region and second region, 20A and 20B respectively. Two viewable portions of two different display assemblies may be aligned with the first and second regions. In other examples, as shown in FIG. 5, the first and second regions, 20A and 20B, may be spaced apart such that two display assemblies may be integrated onto a single overlay sheet. It can be appreciated that the size and/or geometry of overlay may be altered. For example, the overlay may be circular, trapezoidal, rectangular, or square.

Exemplary materials from which the overlay may be constructed include: tempered glass, polymeric materials, and various other suitable materials which may enhance the optics, aesthetics, and/or functionality, of the display system. The overlay may be a continuous sheet such that both the transparent section and the customized section are within a single sheet. The two sections may be separately treated or coated to enable different functionalities for the two sections.

Figure 6:
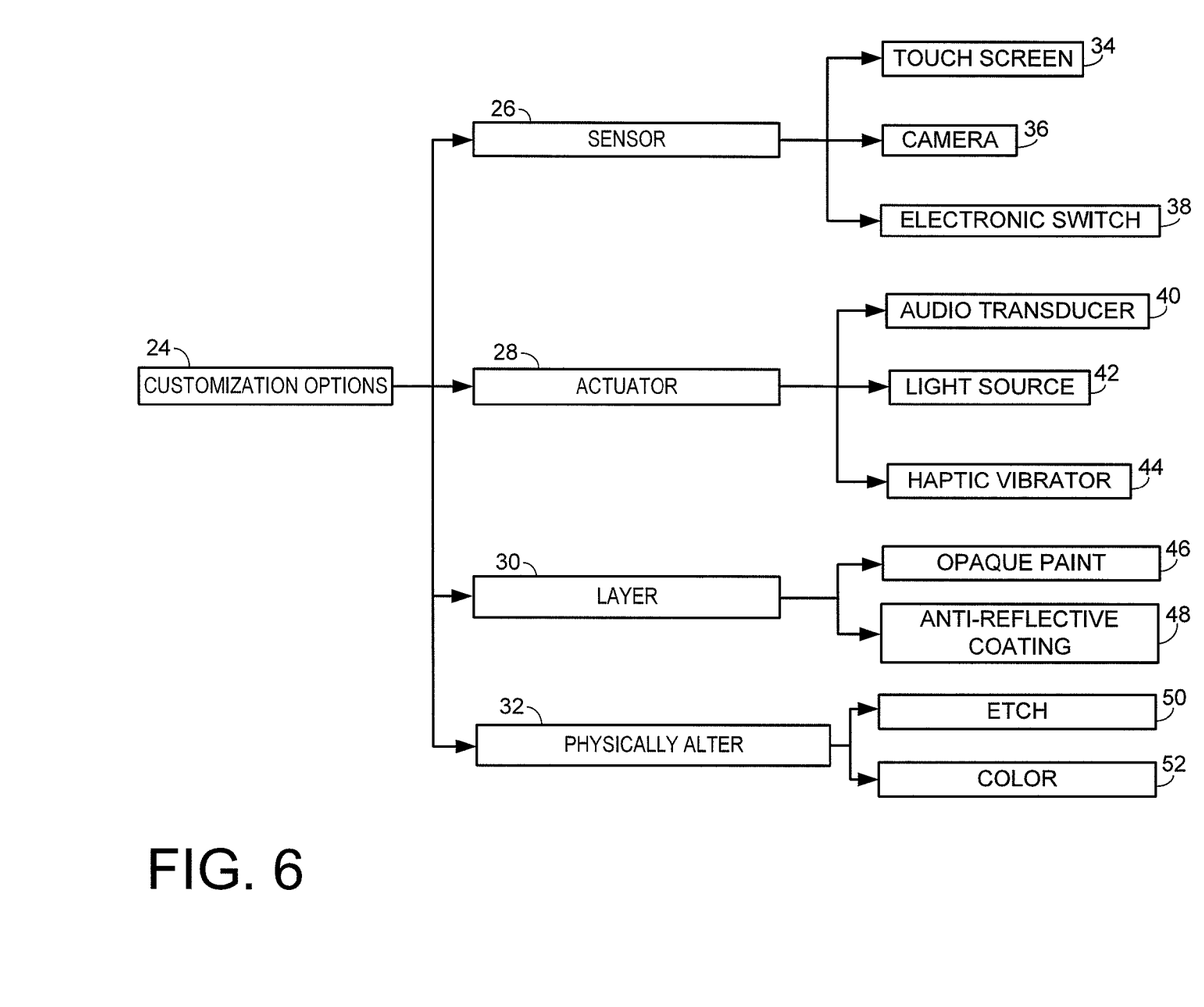
FIG. 6 shows a block diagram of the customization options for an overlay for a display system.

Customization of the overlay allows the display system to be used in a wide range of applications. Such a customized section may be used to achieve desired aesthetic, optical and/or mechanical functionality, increasing customer satisfaction and use applications. As a further example, and not a limitation, FIG. 6 shows an assortment of different customization options 24. The customization options may be referred to as accessories.

The customization options may include bonding various electronic mechanisms or accessories to the overlay such that the display system may have additional auxiliary functions. For example, various sensors 26 and/or actuators 28 may be coupled to the overlay. For example, sensor accessories, such as touch switches or touch screens 34, cameras or camera heads 36, electronic switches 38, pressure sensors (not shown), temperature sensors (not shown), humidity sensors (not shown), and various others, may be coupled to the overlay. Similarly, actuators such as audio transducers 40, light sources 42, haptic vibrators 44, integrated circuit traces (not shown), control panels (not shown), and various others, may be coupled to the overlay. For example, indicator lights may be integrated within the second customized section. For example, indicator lights for various controls may be coupled to the overlay.

The material for bonding the accessories may be the same or different than the optical layer used between the first transparent region and the display region of the display assembly.

As an example, the overlay may include a touch sensor. The touch sensor could be resistive, capacitive, projected capacitive, surface acoustic wave, dispersive acoustic, or any other touch screen technology. The overlay may have one or several regions where the touch sensing is enabled, and the touch sensor may extend over most of the area of the overlay or over limited regions. The regions where touch sensing is enabled may be referred to as touch regions. For example, in the case where two display assemblies are bonded to the touch sensor, the touch sensor might have two independent touch active regions which directly correspond to the location of the display assembly. In this instance, two touch sensors might be used, one for each location or a single multi-location touch sensors might be used. Alternatively, the touch sensor may have a single active touch region that extends over both display assemblies and the touch sensor firmware or application software would determine at which location touch actuation would be enabled. In some embodiments, touch sensing regions that are not aligned with an underlying display assembly may be provided, for example to provide buttons, sliders, dials, and other controls.

Additional customization options may further include applying a layer to a section or portion of the overlay 30. A variety of layers may be selectively applied to the overlay, such as paint, (e.g. opaque paint 46), coating (e.g. anti-reflective coating 48), or other suitable layering.

Yet further, the customization options may include physically altering the appearance or composition of a section of the second section of the overlay 32. As described above, different sections and/or regions may be painted or coated differently from other regions and/or sections, while some regions and/or sections are left uncoated and unpainted. Furthermore, the physical appearance of the overlay may be altered 32 by etching 50 and/or coloring 52 the material of the overlay. Etching the overlay may include an application of an acidic, caustic, or abrasive substance to the customized section of the overlay. In this example the overlay is tempered glass. It can be appreciated that other types of material may be used to construct the overlay or sections of the overlay, as discussed above. Moreover, in some embodiments, patterned conductors or coatings may be integrated within the overlay.

Figure 7:
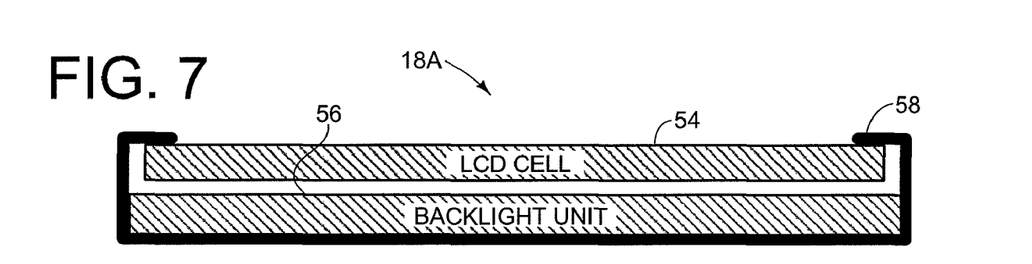
FIG. 7 shows an example of an LCD assembly prior to application of an overlay.
Figure 8:
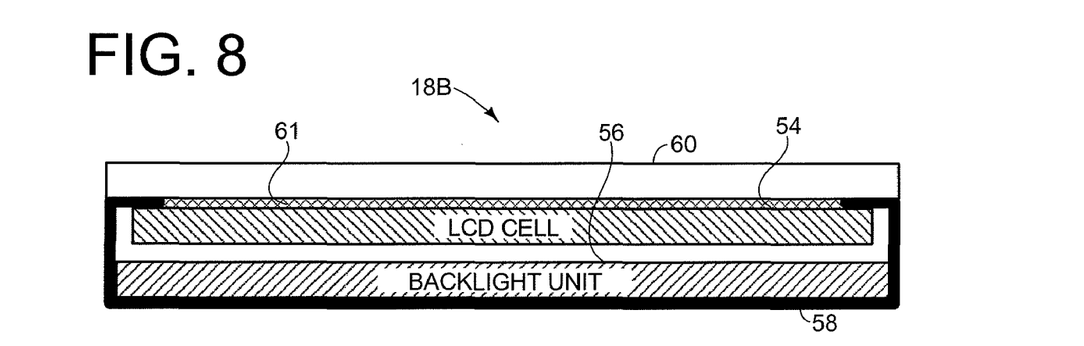
FIG. 8 shows an example of a display system with an overlay applied to an LCD assembly.

FIGS. 7-8 show exemplary embodiments of LCD assemblies, 18A-18B respectively. The exemplary LCD assemblies may be optically bonded to an overlay in a display system. A variety of configurations may be utilized depending on the intended use of the display system. It can be appreciated that a viewable section of the LCD assembly may include a region of the LCD assembly that is configured to emit light.

In particular, FIG. 7 shows an LCD assembly 18A. An LCD cell 54 containing an LCD and polarizers is held in front of a backlight unit 56 which may contain structured brightness enhancement films (not shown), reflective polarizers (not shown), and/or specular reflectors (not shown). In some examples, the LCD may include a liquid crystal layer positioned between two glass sheets. A mounting structure 58 holds the LCD assembly together and may be made up of a plurality of metal and/or plastic parts. Mounting structure 58 may increase the structural integrity of the display and prevent the device from damage and possible failure of electronic componentry. However, the display may be subject to environmental contaminates that get wedged along the mounting structure 58 and the LCD display. As such, in the disclosed system, an overlay may be applied to the top surface of the LCD cell (shown in FIG. 8). Although the LCD assembly is shown with a mounting structure which retains the LCD Cell and backlight unit, in some systems the mounting structure may be of a different configuration or may be non-existent. The first substantially transparent section may extend along the display region of the LCD and a second customized section may extend over the mounting structure 58.

FIG. 8 schematically shows an LCD assembly 18B, in an overlay 60 is bonded to the subassembly using optical adhesive 61. Such a window may be used to increase strength of the display or provide a location for anti-reflective coatings, anti-glare coatings or textures, anti-smudge coatings, EMI filters, or touch switches. Additional films or coatings may be added to the window to achieve the desired mechanical, optical and/or aesthetic functionality.

Figure 9:
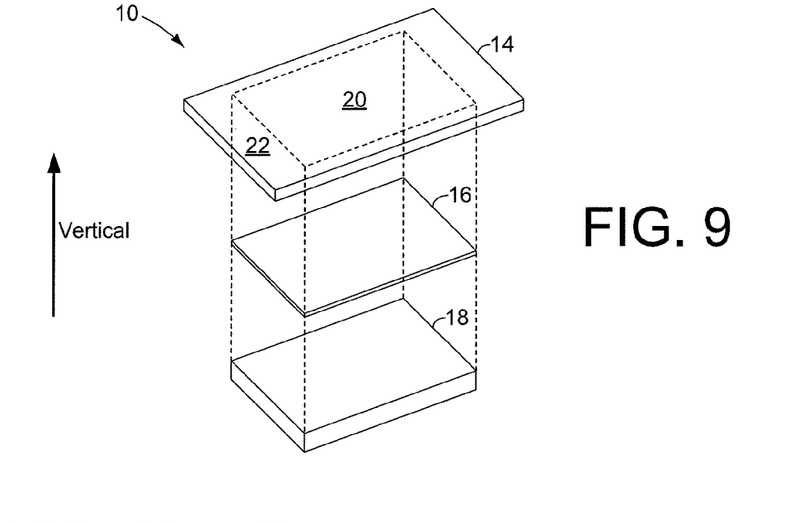
FIG. 9 shows an exploded view of a display system.

FIG. 9 shows an exploded view of an exemplary display system 10 where indicator 18 indicates the display region of the display assembly. As such the display region 18 is vertically aligned with the adhesive and the first substantially transparent section 20 of the overlay 14. In some examples, adhesive 16 may have been previously been applied to overlay 14, thereby forming an adhesive overlay assembly. In other examples, adhesive 16 may be cured to increase the strength of the bond between overlay 14 and display 18.

Overlay 14 may have a first profile which is substantially larger than a second profile of display 18 such that the overlay extends beyond the display in at least one direction. The larger profile of overlay 14 allows for customization of display system 10, increasing the display systems applicability. As shown, first section 20 of the overlay is vertically aligned with a display assembly 18. Although the adhesive is shown in line with the first section and second section 22, in other embodiments, the adhesive may extend beyond the perimeter of the display region of the display assembly. Second section 22 may be customized, as discussed above.

Figure 10:
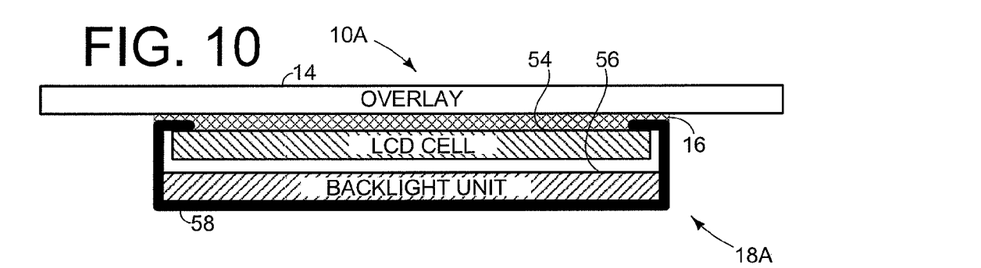
FIG. 10 shows a bezelless display system.
Figure 11:
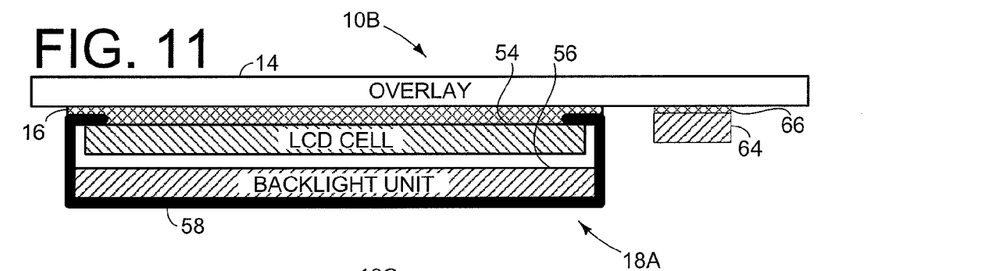
FIG. 11 shows another example of a bezelless display system with an accessory bonded to an overlay.
Figure 12:
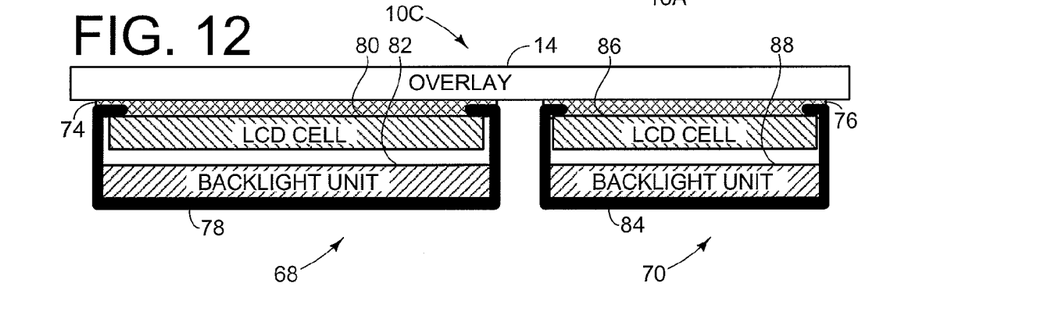
FIG. 12 shows another example of a bezelless display system including two displays.

Several different exemplary constructions of display system 10 are shown in FIG. 10-FIG. 12. The various display constructions are exemplary in nature and non-limiting.

As shown in FIG. 10, a display system 10A may include an overlay 14 and display 18A further including a mounting structure 58, LCD cell 54, and backlight unit 56. The overlay 14 and display 18 may be optically bonded by an adhesive 16. In some examples the adhesive may have a similar refractive index (i.e. optically matched) to the one or more layers in the display and/or the overlay. The LCD assembly 18 does not extend to the edge of the overlay 14. In this way the profile of the overlay is substantially larger than the profile of the LCD assembly. In this example the overlay is substantially planar and enables easy cleaning of the surface and limited crevices for particles, such as dirt to be retained.

FIG. 11 shows an additional exemplary construction of a display system. Display system 10B may include an overlay 14 which may be optically bonded to display assembly 18A. An accessory 64 may be bonded to a customized section of the overlay 14 with an adhesive 66. In this example, the accessory is optically bonded to the overlay with an adhesive similar to the adhesive 16, used to optically bond the display to overlay 14. However, other suitable adhesives may be used to bond accessory 64 to overlay 14. In some examples, accessory 64, may be optically bonded to the overlay 14. The accessory may be a sensor, such as a touch switch, an actuator, such as a light indicator, an audio transducer, a haptic vibrator, etc.

FIG. 12 shows another exemplary display system. Display system 10C that includes a first and a second LCD assembly, 68 and 70 respectively, optically bonded to two transparent sections of overlay 14. Various accessories (not shown in this figure) may be included on the customized section of overlay 14. As shown, a first LCD assembly 68 is optically bonded to overlay 14 by optical adhesive 74, while a second LCD assembly 70 is optically bonded to overlay 14 by an optical adhesive 76. The first LCD assembly 68 may include a bezel 78 partially enclosing an LCD cell 80 and backlight unit 82. The second LCD assembly 70 may include a bezel 84 partially enclosing an LCD cell 86 and backlight unit 88. In some examples, optical adhesive 74 and optical adhesive 76 may be identical or similar. The thickness of the optical adhesive may be such to accommodate any bezel which is used for the LCD assembly. Thus, although a bezel is used to retain the LCD assembly, the overlay is retained without the use of the bezel. Further, while only two displays are illustrated, it is to be understood that virtually any number of different displays can be optically bonded to the same overlay. The displays can be of the same or a different type and/or size.

Figure 13:
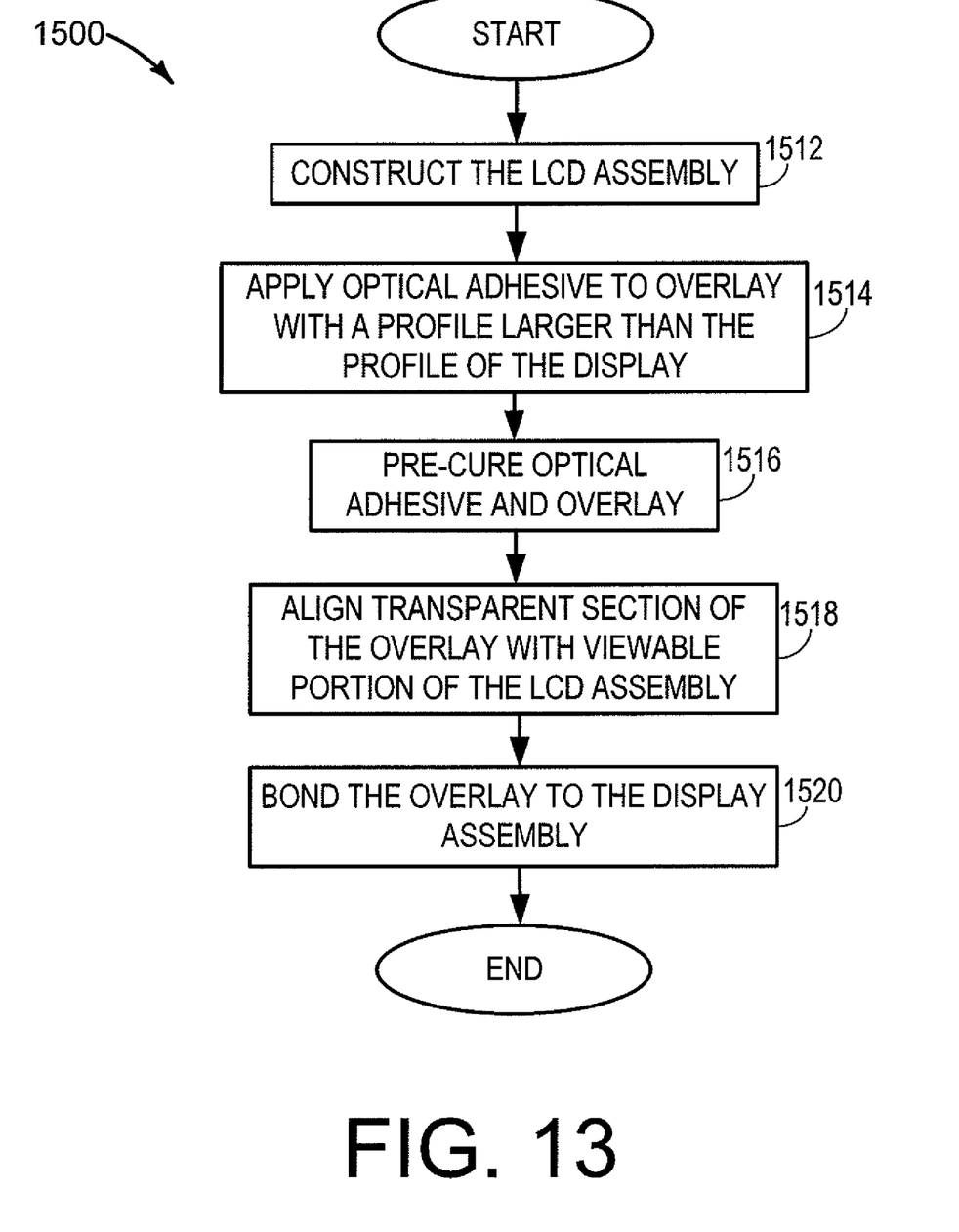
FIG. 13 shows a flow chart which may be utilized to construct a display system.

FIG. 13 shows a flow chart, method 1500, which may be implemented to construct a display system that includes an overlay, an adhesive, and a display assembly. In some examples, the constructed display system may be similar to the display system shown in FIG. 9. In other examples, method 1500 may be used to construct another suitable display system.

First at step 1512, the LCD assembly may be constructed. In some examples, the LCD assembly may be constructed by positioning an LCD cell and/or backlight unit in a mounting structure, allowing a bezel to partially surround the LCD cell, and a backlight unit, as shown in FIG. 7. In other examples, additional components may be positioned in the mounting structure. Furthermore, the LCD cell may include two glass sheets positioned above and below (i.e. sandwiching) a liquid crystal layer. Yet, in other examples, another suitable display assembly may be used, including, but not limited to an OLED, electronic paper display, LED or various others.

Next at step 1514, an optical adhesive may be applied to at least a first transparent section of an overlay. A second section of the overlay may be customized at this step or may be customized after coupling of the overlay with the display assembly. Customizing the second section of the overlay may include bonding one or more accessories, such as adhering a sensor, e.g. a touch switch, or applying a coating to at least a portion of the second section.

As illustrated, in some embodiments, the optical adhesive may be applied to the overlay where the overlay has a larger profile that the profile of the viewable portion of the display assembly. The viewable portion of the display assembly may include a portion of the display assembly that is capable of emitting light. In some examples, the optical adhesive may be a transparent adhesive with a similar refractive index to one or more sections or layers of the display assembly and/or overlay, as discussed above. In this example, the optical adhesive has a similar refractive index to a transparent section of the overlay. In other examples, the optical adhesive may be applied to the display assembly.

Next at step 1516, the optical adhesive and overlay may be pre-cured. Next at step 1518 the transparent section of the overlay is aligned with a viewable portion of the display assembly. Aligning the transparent section of the overlay with the viewable portion of the display assembly may include positioning the display assembly such that the second section of the overlay extends beyond at least one side of the transparent section of the overlay.

Next at 1520 the overlay is bonded to the display assembly. Bonding may include maneuvering the overlay and/or display assembly so that at least a portion of the overlay and display assembly are coupled to form a display system.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Such claims, whether they are directed to a different invention or directed to the same invention, whether different, broader, narrower or equal in scope to any original claims, are also regarded as included within the subject matter of the inventions of the present disclosure.

The invention claimed is:

1. A display system comprising:
   a first display assembly with a display region of a first size;
   a continuous overlay having a first substantially transparent section corresponding to the size of the display region of the first display assembly and a second customized section extending beyond the first substantially transparent section; and
   an optical layer disposed between the first display assembly and the first substantially transparent section of the overlay, the first display assembly optically bonded to the first substantially transparent section of the overlay by the optical layer;
   wherein the optical layer includes a pre-cured adhesive preform.

2. The display system of claim 1, wherein the first display assembly is one of a liquid crystal display, an organic light emitting diode display, and an electronic paper display.

3. The display system of claim 1, wherein the optical layer comprises an adhesive.

4. The display system of claim 1, wherein the display system further comprises a second display assembly optically bonded to the overlay by a second optical layer.

5. The display system of claim 1, wherein the second customized section of the overlay includes an actuator or a sensor accessory.

6. The display system of claim 5, wherein the actuator is one of an audio transducer, a haptic vibrator, and a light source.

7. The display system of claim 1, wherein the second customized section of the overlay includes at least one non-transparent region.

8. The display system of claim 7, wherein the second customized section of the overlay includes at least one additional layer.

9. The display system of claim 8, wherein the at least one additional layer is an opaque coating.

10. The display system of claim 8, wherein the at least one additional layer is an anti-reflective coating.

11. The display system of claim 3, wherein the adhesive includes a two-part cured silicone adhesive.

12. The display system of claim 3, wherein the adhesive has a refractive index substantially similar to one of the first substantially transparent section of the overlay and an exterior surface of the display region of the first display assembly.

13. The display system of claim 1, wherein the second customized section extends beyond the first substantially transparent section along at least two sides.

14. The display system of claim 1, further comprising a second substantially transparent section spaced apart from the first substantially transparent section.

15. The display system of claim 1, wherein the first display assembly is optically bonded to the first substantially transparent section of the overlay without a mechanical bezel overlaying the overlay.

16. The display system of claim 5, wherein the sensor accessory is a touch switch.

17. A method for construction of a display system comprising:
    applying an optical adhesive to a substantially transparent section of an overlay;
    customizing a second section of the overlay;
    aligning the transparent section of the overlay with a viewable portion of a display assembly;
    bonding the overlay and the display assembly so that the optical adhesive is disposed between the display assembly and the viewable portion of the display; and
    pre-curing the optical adhesive and the overlay prior to aligning the transparent section of the overlay with the viewable portion of the display assembly.

18. The method of claim 17, wherein customizing the second section of the overlay includes adhering a sensor to the second section of the overlay.

19. The method of claim 18, wherein customizing the second section of the overlay includes adhering a touch switch to the second section of the overlay.

20. The method of claim 17, wherein customizing the second section of the overlay includes applying a coating to at least a portion of the second section.

21. The method of claim 17, wherein aligning the transparent section of the overlay with the viewable portion of a display assembly includes positioning the display assembly such that the second section of the overlay extends beyond at least one side of the transparent section of the overlay.

22. A display system comprising:
- a first display assembly with a display region of a first size;
- a continuous overlay having a first substantially transparent section corresponding to the size of the display region of the first display assembly and a second customized section extending beyond the first substantially transparent section; and
- an optical layer disposed between the first display assembly and the first substantially transparent section of the overlay, the first display assembly optically bonded to the first substantially transparent section of the overlay by the optical layer;

wherein the optical layer comprises an adhesive; and wherein the adhesive includes a two-part cured silicone adhesive.

* * * * *